United States Patent Office 3,211,669
Patented Oct. 12, 1965

3,211,669
ACTIVATING AND REACTIVATING NICKEL
SULFIDE CATALYSTS
Jack W. Unverferth, Walnut Creek, Calif., assignor to
California Research Corporation, San Francisco, Calif.,
a corporation of Delaware
No Drawing. Filed Sept. 21, 1961, Ser. No. 139,594
9 Claims. (Cl. 252—416)

This invention relates to the activation and reactivation of catalysts comprising nickle sulfide on a refractory oxide support and the use of such catalysts for the hydrogenative conversion of hydrocarbon oils. In a particular aspect the invention relates to the reactivation of hydrocracking catalysts and sulfactive hydrogenation catalysts, containing nickel sulfide as an active component, which catalysts have become deactivated through extensive use in hydrogen-consuming processes for the conversion and/or treatment of hydrocarbon oils. In another particular aspect the invention relates to a method for increasing the activity of freshly prepared catalysts of the above types.

Certain nickel sulfide-containing, refractory oxide-supported, catalysts are found to be particularly useful in processes comprising contacting hydrocarbon oils at elevated temperature and pressure with excess hydrogen and the catalyst at conditions leading to a net consumption of hydrogen and conversion of the oil to a more valuable product. The hydrogen may be consumed: (1) in conversion of olefins and other unsaturated compounds to more saturated compounds; (2) in conversion of contaminants, such as organic nitrogen, oxygen, sulfur, and halogen compounds, to readily removable $NH_3$, $H_2O$, $H_2S$, and acid halides and to hydrogenated organic compounds; (3) in splitting hydrogenation or hydrocracking of high molecular weight compounds to lower molecular weight compounds; or (4) in a combination of any or of all the foregoing reactions. The term "hydrogenative conversion" is used herein to describe any process of the above types. No catalytic process for hydrogenative conversion of hydrocarbon oil has yet been devised wherein the catalyst does not eventually become deactivated, usually by the gradual (or rapid) deposition thereon of carbonaceous material, commonly referred to as "coke." When the catalyst is deactivated, it must either be replaced or else its activity must be restored by some treatment. Regeneration by combustion of the coke is commonly employed. Often, however, mere removal of coke is not sufficient because other deactivating effects relating to the catalyst structure itself may have occurred. Also, the usual regeneration procedures in many cases have adverse effects on the catalyst when used repeatedly. There is, therefore, a distinct need for a method of reactivating deactivated nickel sulfide containing catalysts. It is an object of this invention to provide such a method for reactivation and to provide an improved hydrogenative conversion process by using the reactivated catalyst therein. By means of the invention a deactivated catalyst is made even more active than a fresh catalyst.

In the processes for hydrogenative conversion of hydrocarbon oils, the rate of deactivation of the catalyst usually increases with the severity of the conditions employed, higher temperatures being considered more severe. The more active the catalyst initially, the less severe can be the conditions employed, and consequently the less rapid will be the deactivation. Hence, regeneration or reactivation is required less frequently. There is thus a need for a method of activating or increasing the initial activity of nickel sulfide containing catalysts. It is another object of this invention to provide such a method for activation and to provide an improved hydrogenative conversion process by using the activated catalyst therein.

A further object of the invention is to extend indefinitely the life of a catalyst comprising nickel sulfide on a refractory oxide support, which catalyst is alternately used in a hydrogenative hydrocarbon conversion process and then regenerated until regeneration is ineffective to restore the catalyst to its original activity, by thereafter reactivating the catalyst at least to its original activity.

In accordance with the invention a catalyst comprising nickel sulfide on a refractory oxide support, is activated or reactivated by sequentially converting the nickel component first to nickel oxide, then to reduced nickel metal, than back to nickel oxide, and finally to nickel sulfide. The catalyst is then used in the hydrogenative conversion process whereby improved results and important process enconomies are obtained.

The catalyst may consist essentially of nickel sulfide and a homogeneous refractory oxide support; for example, a nickel sulfide-alumina hydrogenation catalyst. The catalyst may comprise nickel sulfide and one or more other metals on a homogeneous refractory oxide support; for example, a nickel sulfide-molybdenum sulfide-alumina sulfactive hydrogenation catalyst. The catalyst may comprise nickel sulfide and a combination refractory oxide support; for example, a nickel sulfide-silica-alumina hydrocracking catalyst. Other nickel sulfide-containing catalysts to which the invention will apply will be readily apparent to those skilled in the art. For example, there may be mentioned the combinations of nickel sulfide with one or more other metals of Groups VIII, VI-B, I-B of the Periodic Table; and as the refractory oxide support, alumina, silica, magnesia, naturally occurring earths and clays, and combinations thereof. Activating, promoting, and stabilizing components such as halides and metals of Groups I-A and II-A may also be present. Methods for preparing such catalysts are numerous and well known, and need not be reiterated here.

An especially valuable use of the invention is in the reactivation of deactivated high metal content nickel sulfide-molybdenum sulfide-alumina catalysts and nickel sulfide-silica-alumina catalysts, which catalysts are used to advantage in a two-stage process comprising hydrogen-treating a hydrocarbon oil containing nitrogen contaminants in a first stage, using the first-mentioned catalyst, and then hydrocracking the purified oil in a second stage, using the second-mentioned catalyst. When the hydrocarbon oil feed is high boiling, as a heavy gas oil, and/or has a high nitrogen content, as a shale oil distillate, relatively severe conditions of elevated temperature and pressure are required to hydrogenate the nitrogen compounds and other impurities in the first stage. Carbonaceous deposits form on the catalyst causing ever-increasing activity loss. Heretofore, the process had to be stopped and the catalyst replaced unless it was regenerated by burning the carbonaceous deposits from the catalyst and resulfiding. It has been found that regeneration of the nickel sulfide-molybdenum sulfide-alumina catalyst by conventional methods cannot be successfully used more than two or three times. A deactivation effect over and above that attributable to the carbonaceous deposits, affecting the nature of the nickel catalyst itself, prevents the restoration of the catalyst to its original activity.

The present invention restores the catalyst to the activity of freshly prepared catalyst. In fact, as will be shown hereinafter, the activity of a catalyst so severely deactivated that prior regeneration procedures restore the catalyst to only about 50% of fresh activity, can be increased to greater than fresh activity by this invention. As a result, the original catalyst charge can be used for an indefinite period.

Similarly, the nickel sulfide-silica-alumina hydrocracking catalyst is gradually deactivated by poisoning by nitrogen compounds not removed from the feed, by carbonaceous deposits, and by changes in the nickel catalyst itself. Heretofore, conventional regenerations of the nickel sulfide-silica alumina catalyst have been only marginally successful at best and could not be used more than once. Consequently, the present invention is especially suitable as a method for restoring the activity of such catalysts.

The present invention is to be distinguished from conventional regeneration procedures in the following particulars:

The usual regeneration procedure consists of the two steps of (1) oxidizing the catalyst in the course of burning coke deposits therefrom and (2) resulfiding. The present invention comprises four steps in the particular sequence of (1) oxidizing the catalyst to form nickel oxide, (2) reducing the catalyst to form nickel metal, (3) oxidizing the catalyst to form nickel oxide, and (4) sulfiding the catalyst to form nickel sulfide. Thus, in one aspect the invention is an improvement in the method of regenerating supported nickel sulfide catalysts by oxidation and resulfiding, which improvement comprises reducing the catalyst after said oxidation and then reoxidizing the catalyst prior to said resulfiding.

In the usual regeneration procedure the catalyst is oxidized by contacting with a steam-air mixture. In the practice of this invention, the best results are obtained if the oxidations are carried out using a comparatively dry combustion-supporting gas, such as a flue gas or nitrogen-air mixture.

In the usual regeneration procedure the catalyst is oxidized by contacting with a steam-air mixture at a catalyst temperature controlled between about 850° F. and about 1150° F. In the practice of this invention, the best results are obtained if the catalyst is oxidized by contacting with a nitrogen-air mixture at a catalyst temperature controlled below 950° F. Particularly in the case of high metal content nickel sulfide-molybdenum sulfide-alumina catalysts containing 4–10% nickel and 15.5–30% molybdenum, the use of fairly low temperatures during oxidation is beneficial in avoiding damage to the catalyst. Preferably, the oxidations are at catalyst temperatures controlled at least during an initial burn between about 550° F. and about 750° F. using circulating nitrogen at elevated pressure of above 200 p.s.i.g. Air is added to give 0.1–4 mole percent oxygen, preferably. Most advantageously, the pressure is about the same as that normally employed in the hydrocarbon treating process, which may be from 200 to 10,000 p.s.i.g. Combustion products such as $CO_2$, $SO_2$, and $H_2O$ are removed from the circulating gas. The above conditions are preferred for use with nickel-molybdenum-alumina catalysts of high metal content, containing more than 10% sulfur combined with the nickel and molybdenum when the catalyst is in the sulfide state. The high metal content appears to accelerate catalyst sintering if temperatures are not carefully controlled. Good results are also obtained by oxidizing nickel sulfide catalysts of lower metal content in the above manner. However, the lower metal content catalysts are usually less sensitive to elevated temperature, and hence a broader range of conditions may be used.

Reduction of the catalyst is not a normal part of regeneration procedures, but it is a critical step in the activation procedure of this invention. This is surprising, because the catalysts are not active in the reduced nickel state. Rather, the catalysts must be sulfided in order to obtain high activity for the hydrogenative conversion processes in which they are used. Hence, the reduction step is an unexpected essential part of this invention.

In the case of the aforementioned high metal content nickel sulfide-molybdenum sulfide-alumina catalysts, the nickel is reduced in accordance with the invention preferably by contacting the oxidized catalyst with perfluent hydrogen at elevated pressure above 200 p.s.i.g. Preferably, the pressure is at or near the pressure ordinarily employed in the hydrocarbon treating process. The temperature of the hydrogen is adjusted to control the catalyst temperature preferably between 400 and 750° F., initially, and below 1000° F. at all times during reduction. Treatment is continued for a sufficient time to ensure substantially complete reduction of nickel oxide to the metal, usually 24 hours or longer. If dilute reducing gas is employed, such as a hydrogen-nitrogen mixture, longer treating times or higher pressures are used, as compared to reduction with pure $H_2$.

It has previously been proposed to reduce nickel catalysts prior to sulfiding. In such cases, the catalyst containing nickel in the reduced metal state is contacted with a sulfiding medium to convert reduced nickel directly to nickel sulfide. The advantages of the present invention are not obtained by proceeding in such a manner, for it is found that the nickel must be oxidized prior to sulfiding. Accordingly, after reducing the nickel in the above-described manner, the nickel is reoxidized, preferably in the same manner as previously described for the first oxidation. Of course, the catalyst contains very little carbon or coke at this point, and consequently the heat released by combustion during the second oxidation is much less. Nevertheless, heat is released when the nickel is oxidized. Hence, the catalyst temperature should be controlled to below 950° F., and preferably to 550–750° F., initially, in the case of high metal content nickel-molybdenum-alumina catalysts.

In the final step of the invention the catalyst is sulfided. This may be accomplished in any of several known ways, by contacting the catalyst with a sulfiding medium selected from the group consisting of $H_2S$, mixtures of hydrogen and $H_2S$, and mixtures of hydrogen and organic sulfur compounds reducible to $H_2S$ at the conditions employed. The catalyst temperature is controlled below 850° F., and preferably below 750° F. during sulfiding. Reduction to the metal is not desired during sulfiding. Best results are obtained by contacting the catalyst with a mixture of hydrogen and a vaporized organic sulfur compound, such as dimethyl disulfide, isopropyl mercaptan, carbon disulfide, etc., at 450–650° F. The sulfur compound is advantageously dissolved in a light paraffinic solvent and metered into the circulating hydrogen. An excess of sulfiding agent is employed to ensure substantially complete conversion of the nickel oxide to nickel sulfide.

All of the four steps of the invention are preferably carried out while the catalyst is contained within the reaction chamber where it is normally employed for treating hydrocarbon oils. Thus, usually the nickel sulfide-molybdenum sulfide-alumina catalysts are used as one or more fixed beds of catalyst within a high pressure vessel through which hydrogen and the oil to be treated are passed. Recycle hydrogen is separated from the effluent in a high pressure separator and returned to the reactor through a gas recycle system. After terminating the flow of hydrogen and oil when the catalyst is deactivated, the oxidation, reduction, oxidation, and sulfiding steps of this invention may then be carried out while the catalyst is still in place, using much of the recycle gas handling equipment (since elevated pressure is preferably employed in all steps) including use of the high pressure separator as a water or caustic scrubber during the oxidation steps (to remove $SO_2$ in particular). The four steps are not necessarily carried out sequentially without interruption, as it may be desired to open the reactor for inspection or to block in the reactor while performing maintenance on other equipment. Any interruption in the procedure should be when the catalyst is in the oxide state, because many nickel catalysts are pyrophoric when reduced or sulfided.

The following examples illustrate various features of the invention as applied in the reactivation of a high metal content, sulfided, nickel-molybdenum-alumina sulfactive hydrogenation catalyst.

The first example illustrates the preparation and use of such a catalyst, which catalyst is active for hydrodenitrification of contaminated hydrocarbon oils when sulfided but relatively inactive for that reaction when in either the oxidized or the reduced state.

*Example I*

A catalyst was prepared by impregnating preformed ⅛ inch alumina extrudate with nickel nitrate, calcining, then impregnating with ammonium molybdate, calcining, again impregnating with ammonium molybdate, and calcining. This produced an oxide catalyst which contained 20.5% molybdenum (expressed as metal) and 6.4% nickel (expressed as metal) on a support consisting essentially of alumina. The catalyst was placed in a reactor as three fixed beds of catalyst, with liquid distributing trays between the beds. The catalyst was then sulfided by circulating hydrogen containing 1% dimethyldisulfide through the reactor at about 450° F. for several hours, adding more than the theoretical amount of dimethyldisulfide required to convert all the nickel and molybdenum oxides to the metal sulfides. Activity of the freshly prepared catalyst was determined by contacting a light cycle oil boiling between 400° F. and 600° F. and containing 775 p.p.m. nitrogen with the catalyst at 1 LHSV, 645° F., 800 p.s.i.g., and circulating 4000 s.c.f. $H_2$/bbl. The contacted oil contained 0.7 p.p.m. nitrogen after water washing and stripping. The ability to perform this degree of nitrogen removal at the test conditions was defined as 100% activity. The above catalyst was used for hydrotreating a variety of hydrocarbon oils ranging from light naphthas to heavy gas oils, containing from 200 to 4000 p.p.m. nitrogen, at various conditions ranging from 600° F. to 800° F., 800 p.s.i.g.–1100 p.s.i.g., and 0.3 LHSV to 7 LHSV. After a long period of such use the activity of the catalyst had declined such that at 700° F., 800 p.s.i.g., and 1 LHSV, it would reduce the nitrogen content of the light cycle oil only to 12 p.p.m. nitrogen. Thus, the activity of the catalyst had dropped to about 30% of fresh activity (first order reaction kinetics).

Attempts to regenerate samples of the deactivated catalyst of Example I by conventional procedures with steam-air at temperatures above 850° F. were unsuccessful. The following example describes a modified steam-air regeneration which gave relatively better results.

*Example II*

A major portion of the coked catalyst from Example I was regenerated in situ by passing a steam-air mixture containing 1% oxygen through the catalyst beds at 2–5 p.s.i.g. and at a catalyst temperature controlled between 55° F. and 700° F. until the burning wave or temperature rise had passed completely through the reactor. The steam-air inlet temperature was then increased to control the catalyst temperature between 700° F. and 800° F. while a second burn wave passed through the reactor. The temperature was then raised to 900° F. and the oxygen content was increased to 5%, but no further burning occurred, indicating that the catalyst was completely regenerated. The catalyst was then cooled down and resulfided using a mixture of isopropyl mercaptan in hydrogen at a catalyst temperature between 400° F. and 650° F. The activity of the catalyst was then tested and found to be only about 90% of that of fresh catalyst.

The catalyst regenerated as described in Example II was again used for hydrotreating hydrocarbon oils, as in Example I, until its activity had again fallen to about 30% of that of fresh catalyst. The catalyst was then regenerated by a procedure which was found to give better results than the method of Example II, as described in the following example.

*Example III*

Nitrogen was circulated through the reactor containing the coked catalyst at 600 p.s.i.g. Air was added to give 1% $O_2$ at the reactor inlet, where the nitrogen-air mixture was at a temperature of about 600° F., to control the maximum catalyst temperature between 600 and 725° F. as a first burning wave passed through the reactor. The nitrogen-air inlet temperature was then increased to control the catalyst temperature between 700 and 800° F. as a second burning wave passed through the reactor. No further burning occurred when the temperature was raised to 900° F. and the oxygen content was raised to 5%. Throughout the regeneration, the circulating nitrogen was contacted with a caustic solution at about 150° F. to remove $SO_2$ and $CO_2$ from the gas prior to recycling to the reactor. The pressure gradually increased during regeneration to 900 p.s.i.g. due to the continuous addition of air to the closed system. The catalyst was then cooled down and resulfided, at 600 p.s.i.g. The activity of the regenerated catalyst was tested and found to be equal to or slightly better than that of fresh catalyst.

The following example illustrates the use of this invention for activating the regenerated catalyst of Example III.

*Example IV*

A portion of the catalyst which had been oxidized in Example III, but not resulfided, was further oxidized, by contacting the catalyst with a nitrogen-air mixture at 600 p.s.i.g. using substantially the same temperature program and procedure as in Example III. The oxidized catalyst was then reduced by contacting with perfluent hydrogen at 600 p.s.i.g., at 400° F. for two hours, 450° F. for 16 hours, and gradually increasing from 450° F. to 900° F. for 8 hours, until it was assured that nickel oxide had been reduced substantially to nickel metal (and molybdenum oxide to molybdenum). The catalyst was then reoxidized using the procedure described in Example III, and then resulfided as in Example III. The activity of the catalyst was then tested and found to be 120% of that of fresh catalyst. Thus, by the use of this invention the catalyst was not merely regenerated; rather, it was activated.

As previously mentioned, reoxidation prior to sulfiding, after oxidation and reduction, is an essential step. This is shown by the following example.

*Example V*

In a parallel run to Example IV, a portion of the regenerated unsulfided catalyst of Example III was oxidized at the temperature conditions of Example III, then reduced using perfluent hydrogen at temperatures gradually increased from 400° F. to 900° F., and then sulfided directly with dimethyldisulfide in hydrogen at 450–650° F. The catalyst was found to be only 95% as active as fresh catalyst. Thus, omission of the reoxidation step gave inferior results.

In the case of a high metal content nickel sulfide-molybdenum sulfide-alumina sulfactive hydrogenation catalyst which has been used only once or twice for hydrogenation of nitrogen contaminants contained in hydrocarbon oils, mere regeneration by the procedure of Example III in itself causes some activation, especially when the maximum temperature during oxidation is limited to below 850° F. Activation of such catalysts by carefully controlled regeneration at low temperatures with dry combustion-supporting gas free of sulfur oxides is the subject of my copending application, Serial No. 139,612, filed concurrently and entitled, "Activation of Deactivated Hydrodenitrification Catalysts." Unfortunately, even that preferred regeneration method cannot be used indefinitely, as shown by the following example.

*Example VI*

A portion of the coked catalyst prepared in Example I was regenerated and sulfided using the procedure described in Example III and then subjected alternately first to use for hydrogen treating hydrocarbon oils at accelerated coking conditions of 770° F. and 800 p.s.i.g. for about 50 hours or until the activity had declined to about 20% of that of fresh catalyst, and then to regeneration and resulfiding at the conditions of Example III, again used for hydrogen treating, again regenerated and resulfided, and so forth. Once through flow of nitrogen-air was used during regeneration, these runs being made in a laboratory pilot plant. It was found that the regeneration of the catalyst was progressively less effective. Whereas after the first regeneration the catalyst was about 15% more active than fresh catalyst, after the fifth regeneration the catalyst had only 53% of the activity of fresh catalyst. To ensure that all coke deposits had been removed, the five-times regenerated catalyst was again oxidized and resulfided as in Example III. Activity was improved only to about 70% of fresh catalyst activity.

The following example illustrates the use of this invention to reactivate a deactivated catalyst.

*Example VII*

The deactivated sulfided catalyst of Example VI, which had only 70% of fresh activity, was oxidized, reduced, reoxidized, and resulfided at the temperature conditions for the respective steps as described in Example IV. The activity of the catalyst was then tested and found to be 105% of that of fresh catalyst.

The reactivation procedure of this invention can be used repeatedly, instead of regeneration, and with better results as shown by the following example.

*Example VIII*

The reactivated catalyst of Example VII was used for hydrogen treating hydrocarbon oils at accelerated coking conditions until its activity had fallen to about 20% of fresh activity. The catalyst was then treated in accordance with the invention by oxidizing, reducing, oxidizing, and sulfiding as in Example IV. The activity of the catalyst was then found to be 115% of that of fresh catalyst.

The reactivated catalyst of Example VIII was in every respect as good as or better than the freshly prepared catalyst, and it retained the higher activity during long use for hydrogen treating hydrocarbon oils. Hence, the method of reactivation can be used repeatedly to extend indefinitely the useful life of a catalyst batch.

The invention can also be used to activate a fresh catalyst. This is especially valuable in the case of the nickel-molybdenum-alumina catalysts because the rate of deactivation by coking during use for hydrodenitrification is determined primarily by the temperature required to obtain a desired low nitrogen content in the product when the process is first started. Consequently, the run length can be greatly extended if the startup temperature can be reduced only a few degrees, such as would be possible if the catalyst activity were 15–20% higher.

As an activation procedure, the final calcination step in the catalyst preparation procedure may be the first oxidation step of this invention. Instead of sulfiding this oxidized catalyst directly, the catalyst may be reduced, then reoxidized, and then sulfided, in accordance with the invention. Thus, in one aspect the invention is an improvement in the method of preparing a supported nickel sulfide catalyst by calcining a catalyst carrier containing nickel and then sulfiding, which improvement comprises reducing the catalyst after said calcining and then reoxidizing the catalyst before said sulfiding.

The procedure may also be used to activate fresh sulfided catalyst, as shown by the following example.

*Example IX*

A fresh calcined catalyst containing about 6% Ni and about 20% Mo on alumina was sulfided, then oxidized at 600 p.s.i.g. with a dry nitrogen-air mixture containing 0.5% $O_2$ at 600° F. for 5 hours. The maximum catalyst temperature was 720° F. for a short time. Oxidation was completed at 900° F. with 1% $O_2$ in nitrogen. The catalyst was then reduced at 600 p.s.i.g. with hydrogen at 450° F. for 9 hours, and at 900° F. for 7 hours. The catalyst was then reoxidized at 600 p.s.i.g. with 0.5% $O_2$ in nitrogen at 900° F., finishing with 4% $O_2$ at 900° F. Finally, the catalyst was sulfided using dimethyldisulfide in $H_2$ at 600 p.s.i.g. The catalyst was then used for hydrogenative conversion of a heavy straight run gas oil boiling from 560° F. to 960° F. and containing 510 p.p.m. nitrogen. At treating conditions of 690° F., 1350 p.s.i.a. $H_2$ partial pressure, 0.5 LHSV, and hydrogen circulation of 4000 s.c.f./bbl. of oil, the product oil contained 0.3 p.p.m. nitrogen. Another portion of the fresh calcined catalyst was merely sulfided (by the preferred method) and then used to treat the heavy gas oil at 0.5 LHSV, 4000 s.c.f. $H_2$/bbl., and 1350 p.s.i.a. $H_2$. A temperature of 710° F. was required to reduce to product nitrogen content to 0.3 p.p.m., and more of the oil was hydrocracked to light products. At 710° F. the catalyst is deactivated by coke formation much more rapidly than at 690° F. Thus, operation of the process is greatly improved by using therein the catalyst activated in accordance with the invention.

As to the effect of pressure during the several steps of the method, tests have been made at atmospheric pressure, 600 p.s.i.g., and 1200 p.s.i.g. It appears that elevated pressure is important during the reduction step, in obtaining maximum activity improvement. Elevated pressure during oxidation is especially advantageous when a circulating nitrogen-air mixture is used, in accelerating oxidation and facilitating removal of $SO_2$ and $H_2O$.

I claim:
1. The method of activating a catalyst comprising nickel sulfide on a refractory oxide support, which comprises sequentially converting the nickel sulfide component first to nickel oxide by contacting the catalyst with a combustion-supporting gas, then to reduced nickel by contacting with a reducing gas comprising hydrogen, then back to nickel oxide by contacting the catalyst with a combustion-supporting gas, and finally to nickel sulfide by contacting with a sulfiding medium.

2. The method of reactivating a catalyst comprising nickel sulfide on a refractory oxide support, which catalyst has been deactivated by use in a process for the hydrogenative conversion of hydrocarbon oils, which method comprises oxidizing said catalyst by contacting the deactivated catalyst with a combustion-supporting gas to convert nickel sulfide to nickel oxide, then reducing the catalyst so-oxidized by contacting with a reducing gas comprising hydrogen to convert nickel oxide to nickel, then oxidizing the catalyst so-reduced by contacting with a combustion-supporting gas to convert nickel to nickel oxide, and then sulfiding the catalyst so-oxidized by contacting with a sulfiding medium to convert nickel oxide to nickel sulfide.

3. The method of claim 2 wherein nickel sulfide is converted to nickel oxide by contacting the catalyst with a nitrogen-air mixture at a catalyst temperature controlled between 550° F. and 950° F.

4. The method of claim 2 wherein nickel oxide is converted to nickel by contacting the catalyst with hydrogen at an elevated temperature controlled below 1000° F.

5. The method of claim 2 wherein nickel oxide is converted to nickel sulfide by contacting the catalyst with a sulfiding gas selected from the group consisting of $H_2S$, mixtures of hydrogen and $H_2S$, and mixtures of hydrogen and organic sulfur compounds reducible to $H_2S$ at a catalyst temperature controlled below 850° F.

6. The method of claim 2 wherein said catalyst is a high metal content nickel sulfide-molybdenum sulfide-alumina sulfactive hydrogenation catalyst containing more than 10 weight percent sulfur combined with nickel and molybdenum.

7. In the method of regenerating a coked catalyst comprising nickel sulfide and molybdenum sulfide on a refractory oxide support by oxidation to burn coke deposits therefrom and then resulfiding, the improvement of increasing the catalyst activity by reducing the catalyst by contacting with a reducing gas comprising hydrogen after said oxidation and then reoxidizing the catalyst by contacting it with a combustion-supporting gas prior to said resulfiding.

8. The method of reactivating a deactivated nickel sulfide-molybdenum sulfide-alumina catalyst containing 4–10 percent by weight nickel and 15.5–30 percent by weight molybdenum, expressed as metals, which catalyst has been deactivated by use for the hydrogenative removal of nitrogen compounds from hydrocarbon oils at elevated temperature and pressure, which method comprises (1) oxidizing said catalyst to burn coke deposits and to convert nickel sulfide and molybdenum sulfide to nickel oxide and molybdenum oxide by contacting the catalyst with a nitrogen-air mixture at a catalyst temperature controlled between 550° F. and 950° F., (2) then reducing the catalyst by contacting the catalyst with hydrogen at a catalyst temperature controlled between 400° F. and 1000° F., (3) then oxidizing the catalyst by contacting the catalyst with a nitrogen-air mixture at a catalyst temperature controlled between 550° F. and 950° F., and (4) finally sulfiding the catalyst by contacting the catalyst with a sulfiding medium selected from the group consisting of $H_2S$, mixtures of hydrogen and $H_2S$, and mixtures of hydrogen and organic sulfur compounds reducible to $H_2S$ to convert nickel oxide and molybdenum oxide to nickel sulfide and molybdenum sulfide at a catalyst temperature controlled below 850° F.

9. The method of claim 8 wherein the catalyst is oxidized by contacting with a dry nitrogen-air mixture containing 0.1–2 mole percent oxygen at a pressure above 200 p.s.i.g. and a catalyst temperature controlled during an initial burn between 550° F. and 750° F.

References Cited by the Examiner

UNITED STATES PATENTS

| | | | |
|---|---|---|---|
| 2,398,175 | 4/46 | Cole | 252—416 |
| 2,813,835 | 11/57 | Nozaki | 252—411 |
| 2,905,636 | 9/59 | Watkins et al. | 208—216 |
| 3,094,480 | 6/63 | Richardson | 208—216 |

ALPHONSO D. SULLIVAN, *Primary Examiner.*

MAURICE A. BRINDISI, *Examiner.*

UNITED STATES PATENT OFFICE
CERTIFICATE OF CORRECTION

Patent No. 3,211,669　　　　　　　　　　　　　October 12, 1965

Jack W. Unverferth

It is hereby certified that error appears in the above numbered patent requiring correction and that the said Letters Patent should read as corrected below.

Column 2, line 15, for "enconomies" read -- economies --; column 5, line 52, for "55° F." read -- 550° F. --.

Signed and sealed this 19th day of July 1966.

(SEAL)
Attest:

ERNEST W. SWIDER
Attesting Officer

EDWARD J. BRENNER
Commissioner of Patents